Aug. 1, 1961     D. E. ARNOLD ET AL     2,994,213
FLEXIBLE COUPLING

Filed April 6, 1960     2 Sheets-Sheet 1

INVENTORS
DONOVAN E. ARNOLD
MICHAEL J. FABBRI
BY M. A. Hobbs

ATTORNEY

Aug. 1, 1961 D. E. ARNOLD ET AL 2,994,213
FLEXIBLE COUPLING
Filed April 6, 1960 2 Sheets-Sheet 2
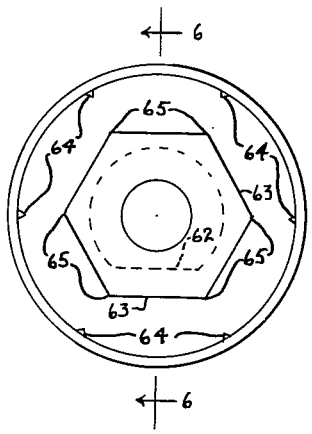
FIG. 4
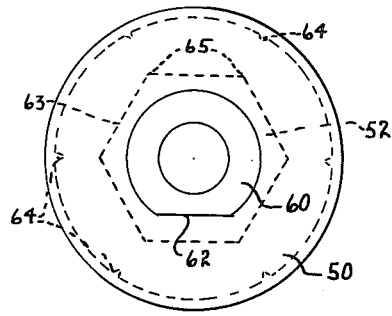
FIG. 5
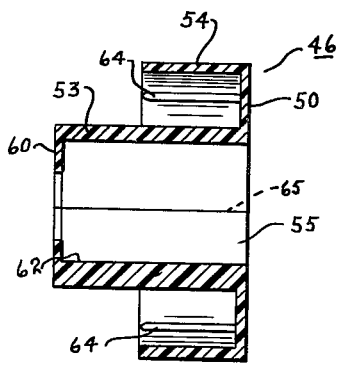
FIG. 6
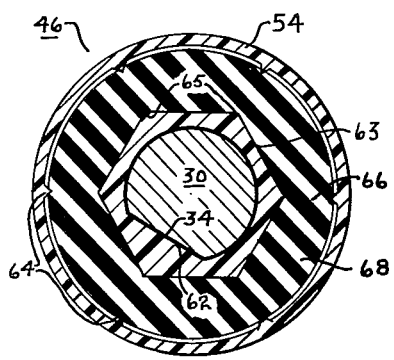
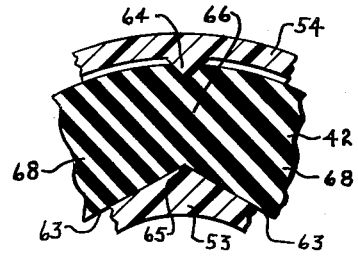
FIG. 8
INVENTORS
DONOVAN E. ARNOLD
MICHAEL J. FABBRI
BY
M. A. Hobbs
ATTORNEY

United States Patent Office 2,994,213
Patented Aug. 1, 1961.

2,994,213
FLEXIBLE COUPLING
Donovan E. Arnold, Michigan City, Ind., and Michael J. Fabbri, Litchfield, Conn., assignors to Nylo-Flex Products Company, La Porte, Ind., and Litchfield, Conn., a firm of Connecticut
Filed Apr. 6, 1960, Ser. No. 20,328
7 Claims. (Cl. 64—11)

The present invention relates to couplings and more particularly to flexible couplings adapted to connect opposed shafts without the use of set screws or other means gripping the two shafts.

A conventional type of flexible coupling to which the present invention generally relates consists of an elongated element of rubber or rubber-like material with fittings on the two ends for engagement with opposed aligned shafts. Until recent years the end fittings were of metal construction secured to the shafts by set screws extending through the fittings and seating against flats on the two shafts, and firmly attaching the coupling to the two shafts. Recent improvements in this type of flexible coupling have included the replacement of the metal end fittings and set screws with couplings constructed of plastic, particularly of nylon, which interlock in one way or another with the ends of the rubber element to prevent relative rotation between the end fittings and the rubber element, and which contain centrally located D-bores for receiving the shafts and interlocking with the flats thereon. In an effort to reduce the cost of this recent type of flexible coupling, the flexible element has been produced by extruding long sections of tubular material with a square or other angular sided longitudinal hole therethrough, and then cutting the sections into the length required for the elements. The fittings with hubs matching the shape of the wall defining the hole through the sections are then placed on the two ends of the element and the assembled coupling is ready to be installed on the shafts without the use of any tools or additional parts. This general type of coupling has certain inherent defects or disadvantages which render the coupling unsatisfactory. It has been found that the interlocking construction between the external surface of the fixture hub and the internal wall surface of the tubular rubber element is often weakened sufficiently by swelling of the element from oils and greases coming in contact therewith during normal use of the coupling that slippage occurs between the element and fixture, thus necessitating frequent replacement of the coupling in order to maintain satisfactory service of the equipment on which the coupling is used. Further, it has also been found that the normal variations in the size and wall thickness of the tubular sections create fabrication and service difficulties in that the fittings which are of necessity accurately made to definite specifications may be difficult to assemble onto the rubber elements if the elements are larger in diameter or the wall thicker than those required for a particular fitting size, or slippage may occur between the rubber element and fittings if the elements are smaller in diameter or the walls thinner than required.

It is therefore one of the principal objects of the present invention to provide a flexible coupling constructed of a tubular element of rubber or rubber-like material and having fittings which firmly interlock with the internal wall configuration of the tubular element and which maintain the interlocking condition regardless of normal variations in size and wall thickness of the tubular element, or swelling and partial deterioration of the element from oils and greases coming into contact with the coupling in service.

Another object of the invention is to provide a flexible coupling which can be readily constructed from extruded tubular stock by merely cutting the stock into sections of the desired length and then assembling prefabricated fixtures onto the ends of the section to form a connection which will not fail, slip or otherwise yield throughout the normal operating life of the coupling.

Still another object of the invention is to provide a relatively simple, easily assembled and installed flexible coupling, having a tubular member with end fixtures which effectively grip the end portions to form a firm connection therebetween without the use of any adjustable or movable parts or elements such as set screws, pins or clamps.

Further objects and advantages of the invention will become apparent from the following description and accompanying drawings, wherein:

FIGURE 4 is an end elevational view of one of the two fixtures shown in the preceding figures;

FIGURE 5 is an elevational view of the opposite end of the fixture shown in FIGURE 4;

FIGURE 6 is an enlarged cross sectional view of the fixture apart from the rest of the assembly, taken on line 6—6 of FIGURE 4;

FIGURE 7 is a vertical cross sectional view of the coupling taken on line 7—7 of FIGURE 2; and FIGURE 8 is an enlarged fragmentary cross sectional view similar to that shown in FIGURE 7.

Figure 1:
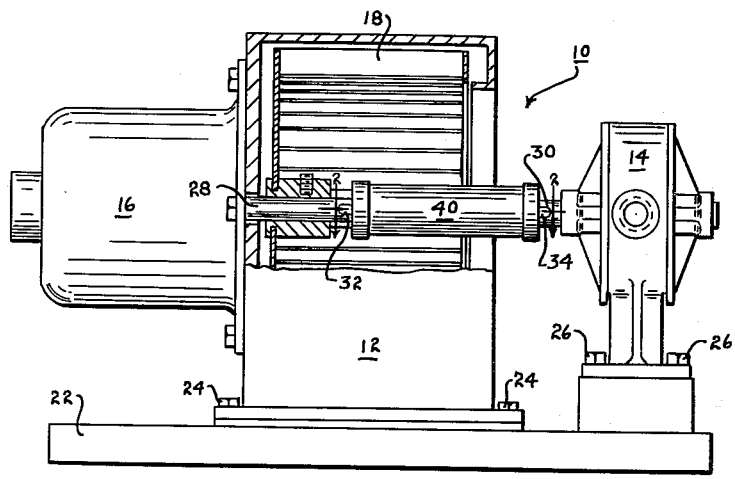
FIGURE 1 is a partial cross sectional and side elevational view of a motor, blower and pump forming a part of a gun-type oil burner, in which our coupling is shown therein in elevation.

Referring more specifically to the drawings and to FIGURE 1 in particular, numeral 10 designates a gun-type oil burner principally used on home heating furnaces and having a blower 12, an oil pump 14 and an electric motor 16 for driving the blower wheel 18 and oil pump 14, the motor being mounted on the side of the blower housing in axial alignment with wheel 18, and the blower and pump being mounted and secured to a base 22 by bolts 24 and 26, respectively. The blower shaft 28 is connected directly to the motor and projects inwardly into the blower wheel, and the pump shaft 30 projects outwardly from the pump in alignment with the blower shaft, the two shafts having the usual flats 32 and 34, respectively. For the purpose of the present description the blower, motor, pump and other parts and components of the burner may be considered as conventional, and hence will not be described in detail herein. The burner and parts thereof are shown merely to illustrate one practical application of the present coupling, shown at numeral 40, which may be satisfactorily used on a variety of different machines and installations.

The embodiment of the present coupling 40 shown in the drawings consists of a flexible tubular member 42 of rubber or rubber-like material and fixtures 44 and 46 of identical construction mounted on the ends of member 42. The external side walls 48 of member 42 are smooth and cylindrical in shape and of uniform diameter throughout the length of the member, whereas the internal side walls 49 of the member, which define centrally located longitudinal hole 52, are hexagonal in shape. The specific material from which member 42 is made is usually not critical in the present couplings, provided the member is flexible and resilient and is sufficiently firm to retain its original shape and transmit the rotative force from the drive shaft to the driven shaft without any appreciable distortion or twisting within its structure; however, in some installations it may be desirable to select a material which will not be attacked excessively by special oils, greases and other chemicals to which the coupling will be subjected during service. The particular construction of the present coupling lends itself to easy, low cost production in that tubular member 42 can be extruded as long sections of uniform diameter and wall thickness, and the sections then merely cut into lengths required for the final coupling member. The length of member 42 can be varied from one coupling design to another, depending upon the particular drive mechanism in which the coupling is to be installed.

Figure 2:
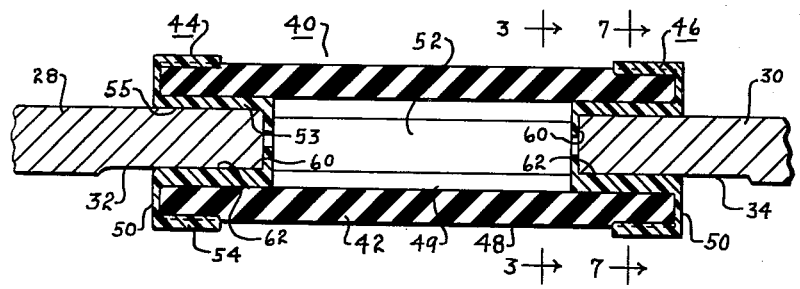
FIGURE 2 is a longitudinal cross sectional view of the coupling shown mounted on the ends of two aligned shafts taken on line 2—2 of FIGURE 1.
Figure 3:
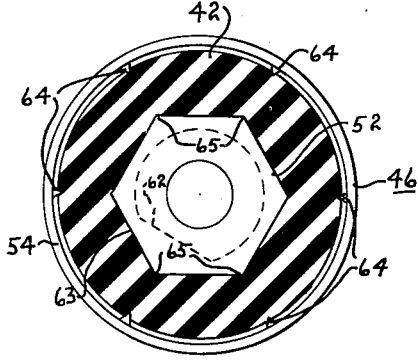
FIGURE 3 is an enlarged vertical cross sectional view of the coupling shown in FIGURES 1 and 2, taken on line 3—3 of FIGURE 2.

Fixtures 44 and 46 are identical in construction and design and are preferably made of nylon or other suitable plastic material, each fixture consisting of a disc-shaped end plate 50 with a central hole, a hub 53 extending inwardly from the hole, and a skirt 54 at the periphery of the end plate, the hub and skirt being joined integrally with the end plate and forming a one-piece, substantially rigid unit. The hub has a D-bore 55 extending nearly the full length thereof and being only slightly larger in diameter than the shaft on which the fixture is to be mounted, to provide a snug fit between the shaft and hub. The external surface of the hub is of the same longitudinal configuration as the internal side walls of member 42, this being hexagonal in shape in the embodiment illustrated in the drawing, and is of a size such that a snug fit is obtained between the internal side walls of the member and the external surface of the hub. The hub may vary in length from one coupling design to another; however, it should be sufficiently long to form an effective solid connection with the end of the shafts. The shaft normally seats against the inner end wall 60 of the hub with the flat on the shaft registering in face-to-face contact with flat 62 on the internal surface of the D-bore 55. The flat 62 may be either across the corner with respect to two facets 63 of the external surface of hub 53 as shown in FIGURES 2, 3 and 7, or parallel with one of the facets 63 as shown in FIGURES 4, 5 and 6.

One of the important features of the present fitting is a series of spaced longitudinally arranged ribs 64 on the internal surface of skirt 54 which, as clearly showing in the drawings, are located directly radially outwardly from the corners 65 between the facets of the hexagonal shaped hub, and hence at the thinnest points in the wall of flexible member 42. The ribs concentrating the pressure at the narrowest sections 66 between the hub and skirt, solidly hold the end of member 42 and prevent the thicker sections 68 from passing between the ribs and corners 65 of the hub. Within normal tolerance limits, the internal surface of the skirt may be in direct contact with the external surface of member 42, or it may be spaced from the external surface as seen in FIGURES 3, 7 and 8. However, within the limits of the permissible variations in outside dimensions of member 42, ribs 64 engage and indent the external surface of member 42 and, with the cooperation of corners 65 of the hub, form effective clamps to prevent relative rotation between the fixtures and member 42 and avoid displacement and deflection between the external surface of the hub and the internal surface of member 42. The ribs preferably extend throughout the length of the skirt and preferably are triangular in cross section shape to give the greatest penetration into the surface of member 42 and hence the maximum gripping action on the member. With the foregoing ribbed construction disposed radially outwardly from corners 65, swelling and expansion of the rubber cause member 42 to press more firmly against ribs 64, and possibly against skirt 54, and augment the clamping force created by the ribs and corners 65. Further, a large inside diameter of the internal hole of member 42 will not result in a loose fit between the member and hub 53 since the walls of member 42 are pressed firmly against the hub by ribs 64.

As the rubber of member 42 ages and hardens, cracking or splitting occurs, and frequently this cracking or splitting is longitudinal and most severe at the ends and at the thinnest points of the rubber member. The ribs 64 also being longitudinal and located at the thinnest points, hold the deteriorating rubber parts firmly against the hub of the fittings and prevent failure and greatly extend the life of the coupling.

In the preferred form of the present coupling, the longitudinal hole through member 42 is hexagonal in cross sectional shape, since this shape provides a substantial number of distinct corners and facets for interlocking with the corresponding features of the hub, which cooperate with ribs 64 to form an effective means for solidly gripping member 42. However, modifications in this construction can be made if desired, for example using the ribs in conjunction with other cross sectional shapes such as quadrangular, octagonal and four leaf clover shapes. In each of these modified forms the longitudinal ribs are located around the internal surface of the skirt radially outwardly from the longitudinal corners or widest points of the hub. Modified forms of the ribs or the equivalent thereof may be used in place of the straight continuous ribs shown. While only one embodiment of the present coupling has been described in detail herein, various changes and modifications in addition to those mentioned above may be made without departing from the scope of the invention.

We claim:
1. A flexible coupling for connecting two aligned shafts having flats thereon, comprising a cylindrical shaped elongated member of rubber having a centrally located longitudinal hole therethrough, the walls defining said hole being hexagonal in cross sectional shape, fixtures of nylon mounted on each end of said member, each fixture including a disc-shaped end plate having a central opening therein and being substantially the same diameter as said member, a hub of substantially the same size as the longitudinal hole in said member and with a hexagonal shape and spaced longitudinal corners thereon corresponding to the cross sectional shape of said hole, a longitudinal D-shaped bore in said hub, a member across the inner end of said hub limiting the innermost position of the shaft inserted in said bore, an annular skirt joined integrally to the periphery of said end member and extending along the external surface of said member, and longitudinally arranged ribs on the inner surface of said skirt located thereon radially outwardly from said corners and indenting said member.

2. A flexible coupling for connecting two aligned shafts having flats thereon, comprising a cylindrical shaped elongated member of a resilient flexible material having a centrally located longitudinal hole therethrough, the walls defining said hole being hexagonal in cross sectional shape, fixtures of nylon mounted on each end of said member, each fixture including a disc-shaped end plate having a central opening therein and being substantially the same diameter as said member, a hub of substantially the same size as the longitudinal hole in said member and with a hexagonal shape and spaced longitudinal corners thereon corresponding to the cross sectional shape of said hole, a longitudinal D-shaped bore in said hub, a stop member for limiting the innermost position of the shaft inserted in said bore, a continuous annular skirt joined to the margin of said end plate and extending along the external surface of said member, and longitudinally arranged ribs on the inner side of said skirt pressing said member firmly against said hub.

3. A flexible coupling for connecting two aligned shafts having flats thereon, comprising a cylindrical shaped elongated member of rubber having a centrally located longitudinal hole therethrough, the walls defining said hole consisting of a series of facets with corners therebetween, fixtures of nylon mounted on each end of said member, each fixture including an end plate having a central opening therein and being substantially the same diameter as said member, a hub of substantially the same size as the longitudinal hole in said member and with an external longitudinal shape and spaced longitudinal corners thereon corresponding to the shape of said hole, a longitudinal D-shaped bore in said hub, stop member limiting the innermost position of the shaft inserted in said bore, a continuous annular skirt joined to the margin of said end plate and extending along the external surface of said member, and longitudinally arranged ribs on the inner side of said skirt pressing said member firmly against said hub.

4. A flexible coupling for connecting two aligned shafts having flats thereon, comprising an elongated member of a resilient flexible material having a centrally located longitudinal hole therethrough, the walls defining said hole consisting of a series of facets with corners therebetween, fixtures of plastic material mounted on each end of said member, each fixture including an end plate having a central opening therein and being substantially the same diameter as said member, a hub of substantially the same size as the longitudinal hole in said member and with an external longitudinal shape and spaced longitudinal corners thereon corresponding to the shape of said hole, an annular skirt joined to the margin of said end plate and extending along the external surface of said member, and longitudinally arranged ribs on the inner surface of said skirt located at points corresponding to the corners on said hub.

5. A flexible coupling for connecting two aligned shafts having flats thereon, comprising an elongated member of flexible material having a centrally located longitudinal hole therethrough, the walls defining said hole consisting of a series of facets with corners therebetween, fixtures mounted on each end of said member, each fixture including an end plate having a central opening therein and being substantially the same diameter as said member, a hub of substantially the same size as the longitudinal hole in said member and with an external longitudinal shape and spaced longitudinal corners thereon corresponding to the shape of said hole, a member across the inner end of said hub, a skirt means joined to the margin of said end plate and extending along the external surface of said member, and longitudinally arranged ribs on the inner surface of said skirt means located at points corresponding to the corners on said hub and indenting said member.

6. A coupling, comprising a member of flexible material having a centrally located longitudinal hole therethrough, the walls defining said hole consisting of a series of facets with corners therebetween, fixtures mounted on each end of said member, each fixture including an end plate having a central opening therein, a hub of substantially the same size as the longitudinal hole in said member and with an external longitudinal shape and spaced longitudinal corners thereon corresponding to the shape of said hole, a continuous annular skirt joined to said end plate, and longitudinally arranged ribs on the inner side of said skirt pressing said member firmly against said hub.

7. In a flexible coupling: an elongated member having a centrally located longitudinal hole therein, the walls defining said hole consisting of a series of facets with corners therebetween, fixtures mounted on each end of said member, each fixture including an end plate, a hub of substantially the same size as the longitudinal hole in said member and with an external longitudinal shape and spaced longitudinal corners thereon corresponding to the shape of said hole, an annular skirt joined to and extending along the external surface of said member, and longitudinally arranged ribs on the inner surface of said skirt at the points corresponding to the corners on said hub and indenting said member.

References Cited in the file of this patent

UNITED STATES PATENTS

| | | |
|---|---|---|
| 2,170,627 | Berryman | Aug. 22, 1939 |
| 2,174,010 | Patterson | Sept. 26, 1939 |
| 2,857,749 | Fabbri et al. | Oct. 28, 1958 |
| 2,867,102 | Williams | Jan. 6, 1959 |
| 2,908,150 | Stern | Oct. 13, 1959 |